E. A. POND.
Pill Machine.
No. 12,960.
Patented May 29, 1855.
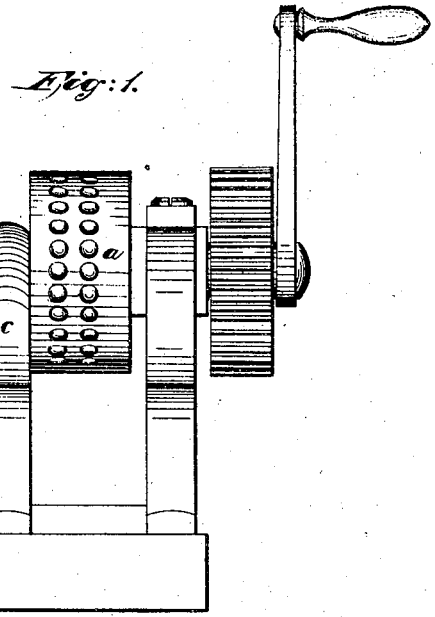
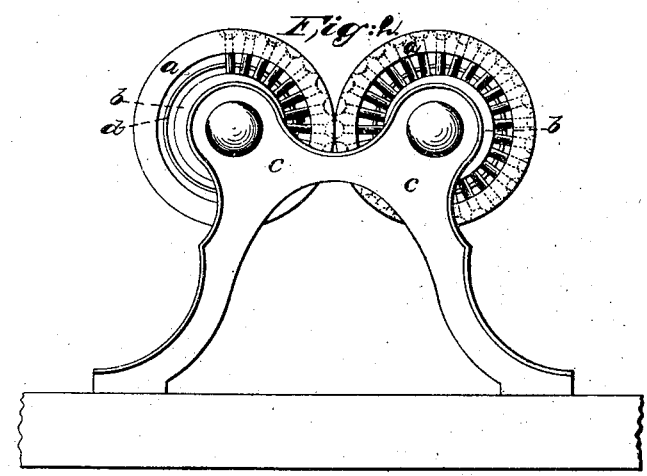
Witnesses:
J. H. Hodges
S. H. Hodges
Inventor:
Erasmus A. Pond

UNITED STATES PATENT OFFICE.

ERASMUS A. POND, OF RUTLAND, VERMONT.

IMPROVEMENT IN PILL-MAKING MACHINES.

Specification forming part of Letters Patent No. 12,960, dated May 29, 1855.

*To all whom it may concern:*

Be it known that I, ERASMUS A. POND, of Rutland, in the county of Rutland and State of Vermont, have invented a new and useful Improvement in Machines for Manufacturing Pills or Improved Pill-Machines, of which I declare the following to be a full and exact description, reference being had to the accompanying drawings, and to the letters of reference thereon, each of which designates the same part in all the drawings.

The machines of which my device is an improvement consists, mainly, of two metallic cylinders, $a\ a$, of the same size placed side by side and revolving toward each other downward. In the faces of these cylinders are hemispherical pits or excavations of the size and shape of half of one the pills to be manufactured. The pits are so arranged upon the cylinders that those upon the one match exactly against those upon the other, the cylinders being geared so as to register. When the pits upon the cylinders meet, they form a mold of the precise shape of the pill. There are also contrivances for feeding the pill mass to the cylinders, which it is not necessary here to describe.

In the use of this machine a difficulty is found in disengaging the pill from the mold, to which it adheres; and the object of my invention is to remove this. For this purpose the cylinders are made without a journal at the end opposite to the gearing, and open and hollow through their working length, leaving a thickness of three-quarters of an inch, or thereabout. Within each of them is another stationary cylinder, $b\ b$, firmly secured to a metallic frame and eccentric to the other cylinders, so as to be one-third or one-half an inch from the latter where the two touch, and nearest to them at the opposite point. The pits are arranged in two circles around each working-cylinder, the pits in one circle exactly opposite to those in the other, forming pairs. A hole of half the size (more or less) of each pit is drilled through the bottom of it. A brass wire large enough to fill the hole, yet move freely in it, is bent at right angles twice, so as to form a fork, Figure 3, and the prongs are to be inserted from the inside of the cylinder through each pair of the holes. The ends of these wires are to be drilled, so as to make the pits complete and form a mold at the point where the cylinders meet and the pill is formed. As the cylinder revolves the loop of the wires will slide over the inside stationary cylinder, and the wires will be thrust gradually out by it as they approach the opposite point and throw out the pills. A metal hoop or ring, $d$, lies between the loop of the wires and the outside cylinders, (the wires having been inserted over it,) just large enough to encircle the loops of the wires and hold them close to the inside cylinder. As the wires are carried around to the point where the cylinders are in contact they are drawn in by the ring to their former position and leave the pits in a perfect form, so as to constitute a mold for the pill.

Fig. 1 is an end view, and Fig. 2 a side view, of the machine, showing the cylinders, wires, and ring, the wires being part of them removed to show the ring more plainly.

To prevent the working-cylinders from spreading apart at the open ends, the frame at that end may be enlarged so as to embrace them and have a bearing against their outer periphery, and a pivot or journal upon the inside end of the stationary cylinders, upon which the outside cylinders may turn, will contribute to the steadiness and firmness of the former.

What I claim as my invention, and desire to secure by Letters Patent, is—

The hollow working-cylinder with a stationary cylinder inside and eccentric to it, the pits on the outside cylinders being perforated and the perforations supplied with wires, bent as above described, with a ring around the loops so that the wires are thrust out and drawn in, as above described, as the working cylinders revolve.

ERASMUS A. POND.

Witnesses:
J. H. HODGES,
S. H. HODGES.